Patented Mar. 1, 1938

2,109,806

UNITED STATES PATENT OFFICE 2,109,806

METALLIFEROUS AZO-DYESTUFFS AND PROCESS OF MAKING SAME

Fritz Straub and Willi Widmer, Basel, Switzerland, assignors to Society of Chemical Industry in Basle, Basel, Switzerland No Drawing. Application June 22, 1936, Serial No. 86,694. In Switzerland July 12, 1935

10 Claims. (Cl. 260—12)

It has been found that metalliferous azo-dyestuffs can be produced by treating with agents yielding metal azo-dyestuffs of the general formula

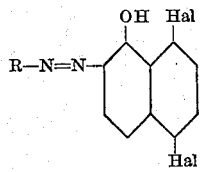

wherein R represents a phenyl radical containing lake-forming groups.

The azo-dyestuffs used as parent materials for the present process may be obtained by uniting with 5:8-dihalogen-, such as, for example, 5:8-dichloro- or 5:8-dibromo-1-hydroxynaphthalene, diazo-compounds of the benzene series containing in ortho-position to the amino-group a hydroxyl-group, a carboxyl-group, an alkoxy-group or the salicylic acid grouping, such, as, for example, ortho-aminophenols, anthranilic acids or amino-salicylic acids which contain still further substituents, such as, for example, halogens (chlorine and bromine) or sulfo-, nitro-, alkyl- (methyl- and ethyl-) and alkoxy- (methoxy- and ethoxy-) groups.

Suitable diazo-compounds are for example the diazo-compound of 2-amino-1-phenol-4:6-disulfonic acid, 4-nitro-2-amino-1-phenol-6-sulfonic acid, 6-nitro-2-amino-1-phenol-4-sulfonic acid, 4-chloro-2-amino-1-phenol-6-sulfonic acid, 4-methyl-2-amino-1-phenol-5-sulfonic acid, 4-chloro-2-amino-1-phenol and 5-nitro-2-amino-1-phenol.

The treatment of the azo-dyestuffs with agents yielding metal, such as, for instance, agents yielding chromium, copper, iron and cobalt, may be carried out according to generally known methods in an acid, neutral or alkaline medium, with or without suitable additions, such as, for example, salts of inorganic or organic acids or free organic acids, in the presence or absence of organic solvents, such as, for example, alcohols or pyridine, in an open vessel or under pressure.

The metalliferous dyestuffs may be used for dyeing and printing materials of any kind and particularly for dyeing and printing animal fibers, such as, for example, wool and silk. They produce various tints of very good fastness properties.

The following example illustrates the invention:—

26.9 parts of 2-amino-1-phenol-4:6-disulfonic acid are diazotized in usual manner and coupled with 23 parts of 5:8-dichloro-1-hydroxynaphthalene in an alkaline medium. The dyestuff thus formed is separated by addition of common salt and filtered.

The dried dyestuff of the formula

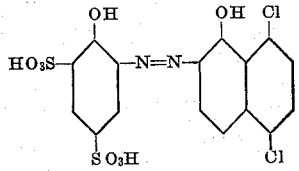

is a dark brown-red powder dissolving in water and dilute sodium carbonate solution to a violet-blue solution, in caustic soda solution of 10 per cent. strength to a blue-red solution and in concentrated sulfuric acid to a green solution. It dyes wool from an acid bath blue-red tints which become violet when after-chromed.

If the dyestuff paste obtained above is heated to boiling for a long time in a reflux apparatus with 500 parts of water and 100 parts of a chromium sulfate solution containing 8.4 per cent. of $Cr_2O_3$, there is obtained a blue-violet chromium compound of the dyestuff which can be precipitated on addition of common salt.

The dried chromium compound is a violet-black powder dissolving in water and dilute sodium carbonate solution to a blue-violet solution, in caustic soda solution of 10 per cent. strength to a red-violet solution and in concentrated sulfuric acid to a blue-green solution. It dyes wool from a sulfuric acid bath pure, very uniform blue-violet tints, which are characterized by very good fastness.

If instead of 5:8-dichloro-1-hydroxynaphthalene there is used the 5:8-dibromo-1-hydroxynaphthalene, a dyestuff having similar properties is obtained.

What we claim is:—

1. Process for the manufacture of metalliferous azo-dyestuffs, comprising treating with agents yielding metal, azo-dyestuffs of the general formula

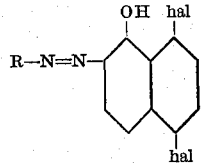

wherein R represents a phenyl radical containing lake-forming groups.

2. Process for the manufacture of chromiferous azo-dyestuffs, comprising treating with agents yielding chromium, azo-dyestuffs of the general formula

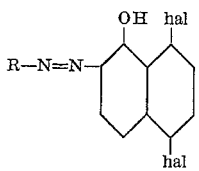

wherein R represents a phenyl radical containing lake-forming groups.

3. Process for the manufacture of chromiferous azo-dyestuffs, comprising treating with agents yielding chromium, azo-dyestuffs of the general formula

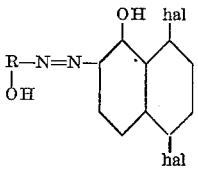

wherein R represents a phenyl radical whose hydroxyl group stands in ortho-position to the azo-bridge.

4. Process for the manufacture of chromiferous azo-dyestuffs, comprising treating with agents yielding chromium, azo-dyestuffs of the general formula

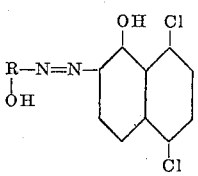

wherein R represents a phenyl radical whose hydroxyl group stands in ortho-position to the azo-bridge.

5. Process for the manufacture of a chromiferous azo-dyestuff, comprising treating the azo-dyestuff of the formula

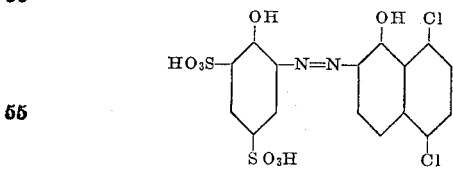

with agents yielding chromium.

6. Complex metal compounds of azo-dyestuffs of the general formula

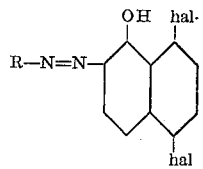

wherein R represents a phenyl radical containing lake-forming groups.

7. Complex chromium compounds of azo-dyestuffs of the general formula

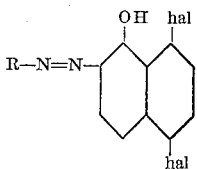

wherein R represents a phenyl radical containing lake-forming groups.

8. Complex chromium compounds of azo-dyestuffs of the general formula

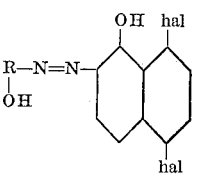

wherein R represents a phenyl radical whose hydroxyl group stands in ortho-position to the azo-bridge.

9. Complex chromium compounds of azo-dyestuffs of the general formula

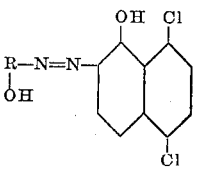

wherein R represents a phenyl radical whose hydroxyl group stands in ortho-position to the azo-bridge.

10. The complex chromium compound of the azo-dyestuff of the formula

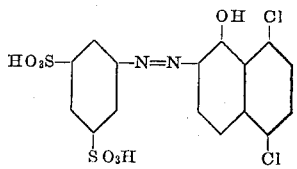

FRITZ STRAUB.
WILLI WIDMER.